United States Patent [19]

Shaw et al.

[11] Patent Number: 5,794,401

[45] Date of Patent: Aug. 18, 1998

[54] DURABLE ARCHITECTURAL FLOORING AND METHOD OF FABRICATING THE SAME

[76] Inventors: Lee A. Shaw, 1924 Irvine Ave., Newport Beach, Calif. 92660; Ronald D. Shaw, 1988 Pelican, Costa Mesa, Calif. 92626

[21] Appl. No.: 868,187

[22] Filed: Jun. 3, 1997

[51] Int. Cl.$^6$ .................................................... E04B 1/00
[52] U.S. Cl. ...................... 52/741.41; 427/202; 427/203; 427/204
[58] Field of Search ..................... 52/741.41, 741.9; 427/202, 203, 204

[56] References Cited

U.S. PATENT DOCUMENTS

| | | | |
|---|---|---|---|
| 2,200,433 | 5/1940 | Ripley | 94/24 |
| 2,277,203 | 3/1942 | Boult | 94/24 |
| 2,296,453 | 9/1942 | Saffert | 25/155 |
| 3,334,555 | 8/1967 | Nagin et al. | 94/3 |
| 4,146,599 | 3/1979 | Lanzetta | 264/35 |
| 4,443,496 | 4/1984 | Obitsu et al. | 364/69 |
| 4,496,504 | 1/1985 | Steenson et al. | 264/69 |
| 4,662,972 | 5/1987 | Thompson | 427/202 X |
| 4,748,788 | 6/1988 | Shaw et al. | 52/742 |
| 5,226,279 | 7/1993 | Rendon-Herrero | 52/741.41 X |
| 5,494,729 | 2/1996 | Henry et al. | 427/202 X |
| 5,645,664 | 7/1997 | Clyne | 52/741.41 X |

OTHER PUBLICATIONS 4 page brochure for Ardex, Inc., "Self-Leveling Toppings and Underlayments".
4 page advertising brochure for Schwing AMERICA Inc., "Truck or Trailer Mounted Concrete Pump".
4 page advertising brochure form Mayco Pump Corp., "The ST Series of Mid Range Concrete Pumps".
1 page flyer from Quick Mix.
1 page advertisement from Concrete Construction, Aug. 1993, "The Cemen-Tech Advantage".
1 page instructions from L.M. Schofield Company, "Lithotex Top Surface Retarder".
5 page article form Concrete Products, Apr. 1988, regarding Integral Color In Concrete.
9 page article from Comnrete information regarding Finishing Concrete Slabe, Exposed Aggregate, Patterns, and Colors.
32 page article from Portland Cement Association regarding Color & Texture in Architectural Concrete.
36 page article from Journal of the American Concrete Institute, Oct. 1947, vol. 19, No. 2 regarding Cement-Aggregate Reaction in Concrete.
2 page product information sheet from Sinak Corporation regarding Sinak Sealers HLQ–625, HLS–124 and HLQ–250.
6 page document from information Access Co., 1984 regarding Specialty Concretes.

*Primary Examiner*—Creighton Smith
*Attorney, Agent, or Firm*—Stetina Brunda Garred & Brucker

[57] ABSTRACT

An architectural flooring and method of producing the same. The method of producing the architectural flooring comprises the steps of preparing a substrate upon which the flooring is to be fabricated. Thereafter, there is applied a self-leveling topping upon said substrate to a thickness of approximately 1 inch or less. The topping is then seeded with a plurality of selectively chosen stones, such as granite or marble, to thus achieve a desired appearance. Alternatively, the seed material may be integrally mixed with the self-leveling topping prior to the application of the topping. The self-leveling topping having the seed material embedded therewithin is then allowed to dry and thereafter may be ground, via a surface grinder, so that the surface of the flooring has a smooth finish. A seal may then be applied to give the flooring a polished look. A resultant floor is exceptionally durable and may withstand substantial pedestrian traffic. The flooring may further be fabricated to assume or assimilate the appearance of terrazzo.

15 Claims, 2 Drawing Sheets

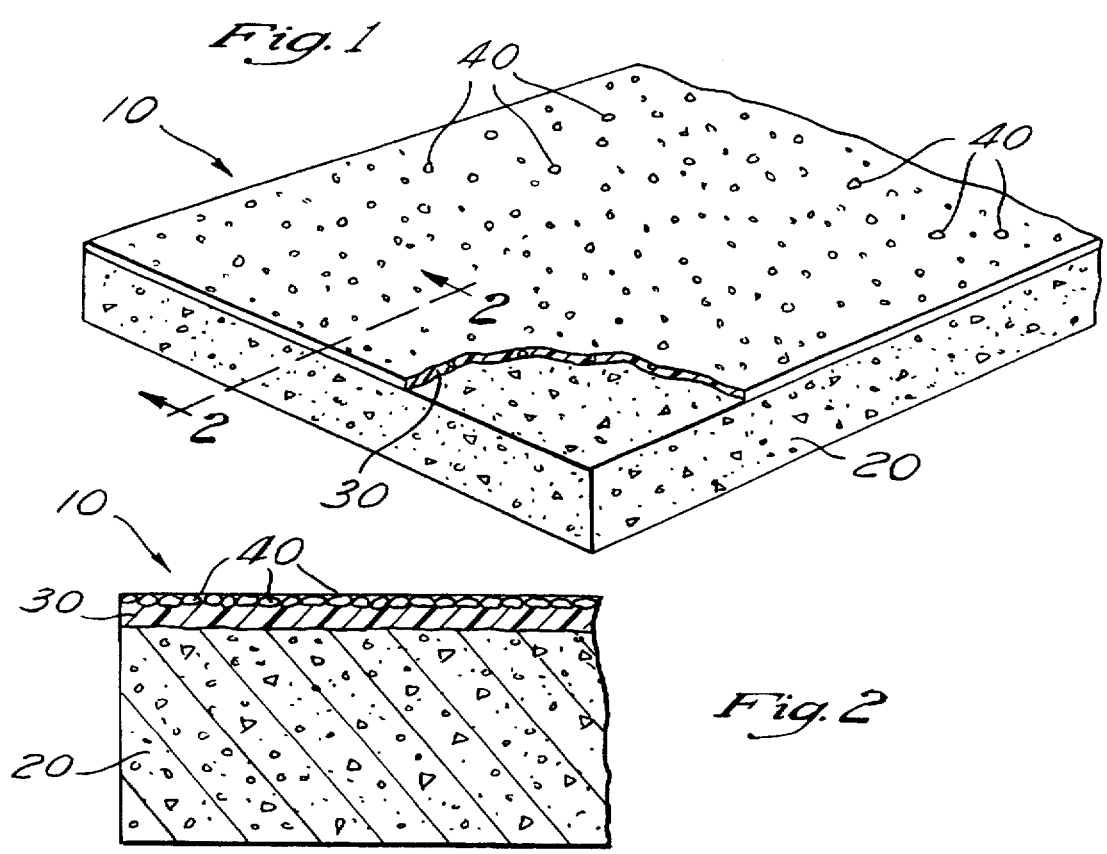

DURABLE ARCHITECTURAL FLOORING AND METHOD OF FABRICATING THE SAME

FIELD OF THE INVENTION

The present invention relates generally to flooring surfaces, and more particularly, durable architectural floorings and method of fabricating the same.

BACKGROUND OF THE INVENTION

As is well-known in the fields of construction and architecture, a certain type of flooring, known as terrazzo, is often desired for various building projects. In this regard, terrazzo is a mosaic flooring consisting of small pieces of stone, such as marble or granite, that are set in mortar and given a high polish.

While terrazzo is exceptionally durable and has an impressive appearance, significant drawbacks exist with respect to the manufacture of such flooring. In this regard, because terrazzo necessarily requires that a thick coat of cement be applied to suspend and support the pieces of marble or granite, terrazzo may typically only be formed upon exceptionally rigid and durable support surfaces capable of supporting the weight of such thick cement layer.

Moreover, such terrazzo-type floorings are well-known to be labor intensive, time consuming and expensive to manufacture. Specifically, to fabricate terrazzo involves precise leveling and heavy grading of the surface upon which the terrazzo is to be formed. Thereafter, it is necessary to apply a thick layer of cementitious epoxy upon the surface whereby the small pieces of stone, such as marble or granite, are broadcast over and troweled into the top surface thereof via a labor-intensive process. Alternatively, the seed material may be combined with the cementitious epoxy to form an integral mix that is then poured upon the surface. Once applied to the surface or substrate, the epoxy must then be allowed sufficient time to dry and harden and thereafter be given a high polish.

As a result of the aforementioned drawbacks associated with forming terrazzo-type floorings, many builders have had to forego fabricating the same although oftentimes ideally considered the flooring of choice. Accordingly, there exists a need in the art a method for fabricating a terrazzo-like flooring that is less time consuming, less labor intensive, and less expensive than prior art methods. There is additionally a need in the art for a terrazzo-like flooring that is extremely durable and can withstand rigorous pedestrian traffic thereover that can further be formed to have a thickness that is substantially less than conventional terrazzo-type floorings.

SUMMARY OF THE INVENTION

The present invention specifically addresses and alleviates the aforementioned deficiencies in the art. Specifically, the present invention comprises an architectural flooring that simulates terrazzo and method of producing the same that is substantially less labor intensive and time consuming than prior art techniques. The resultant flooring is further suitable for high traffic pedestrian flooring applications and may be produced in varying colors to closely resemble or assimilate the aesthetics of terrazzo. The flooring may additionally be formed upon any of a number of conventional surfaces and is specifically designed to have a thickness substantially less than conventional terrazzo floorings.

In the preferred embodiment of the method of the present invention, the substrate or surface upon which the flooring is to be formed is cleaned and leveled off. Thereafter, there is applied onto the substrate a layer of cementitious, self-leveling topping, such as ARDEX® or FLO-TOP®, having a thickness of no greater than 1 inch, and preferably has a thickness of approximately ½ inch. A desired seed material, namely, a particular type of stone such as granite or marble, is broadcast over the topping where the same becomes embedded thereupon. Alternatively, the seed material may be integrally mixed with the self-leveling topping whereby the resultant mixture is then applied to the substrate. The self-leveling topping with seed material is then allowed to dry and is then ground, via a surface grinder, so that the top surface thereof is made smooth. Finally, a sealer, such as an acrylic seal, is applied to the flooring to give the flooring a wet, polished look.

It is therefore an object of the present invention to provide an architectural flooring and method of making the same that may simulate terrazzo yet is substantially less time consuming and labor intensive to fabricate.

Another object of the present invention is to provide an architectural flooring and method of making the same wherein the resultant flooring is extremely durable and can withstand substantial pedestrian traffic.

Another object of the present invention is to provide an architectural flooring and method of making the same wherein such flooring may be fabricated upon a multiplicity of different surfaces that are not dependent upon the ability of the surface to support the weight of such flooring.

A still further object of the present invention is to provide an architectural flooring and method of making the same that is of simple construction, may be readily and easily fabricated, and substantially less expensive than similar-type floorings.

BRIEF DESCRIPTION OF THE DRAWINGS

These, as well as other features of the present invention, will become more apparent upon reference to the drawings, wherein:

FIG. 1 is a partial perspective cross-sectional view of an architectural flooring according to a preferred embodiment of the present invention;

FIG. 2 is a cross-sectional view taken along line 2—2 of FIG. 1; and

DETAILED DESCRIPTION OF THE PREFERRED EMBODIMENT

Figure 3:
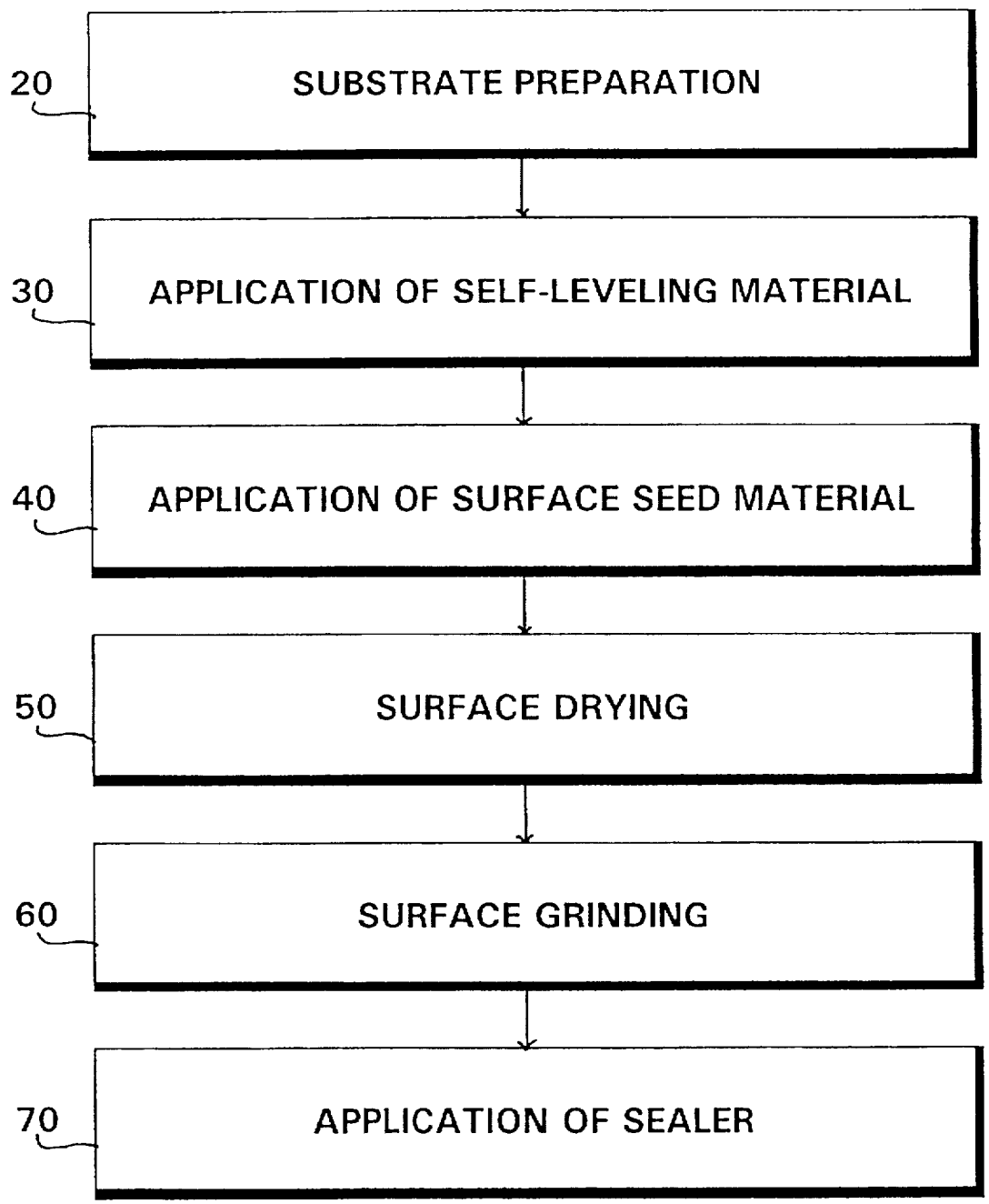
FIG. 3 is a schematic flow diagram of the manipulative steps utilized in producing the architectural flooring of the present invention.

The detailed description set forth below in connection with the appended drawings is intended merely as a description of the presently preferred embodiments of the invention, and is not intended to represent the only forms in which the present invention may be constructed or utilized. The description sets forth the functions and sequence of steps for construction and implementation of the invention in connection with the illustrated embodiments. It is to be understood, however, that the same or equivalent functions and sequences may be accomplished by different embodiments that are also intended to be encompassed within the spirit and scope of the invention.

Referring to FIGS. 1–3, the architectural flooring 10 and method producing the same is pictorially and schematically illustrated. As is conventional, the initial step in the method of the present invention comprises the preparation of the base or substrate surface 20 upon which the flooring is to be formed. Advantageously, the flooring of the present invention may be formed upon virtually all types of conventional flooring surfaces, including plywood, concrete, and even existing tile, and is not dependent on the ability of the substrate to support the weight of conventional terrazzo floorings.

To prepare the surface, such surface need only be made generally clean, with any loose debris being removed therefrom. In cases where the substrate 20 consists of concrete, it may be necessary to beadblast or sandblast the top surface thereof to enhance the ability of the flooring to be formed thereupon. Additionally, as part of the preparation of the substrate, it should be confirmed that such surface is generally level.

Thereafter, there is applied a layer of cementitious, self-leveling topping 30 upon the substrate 20. Such cementitious self-level topping may comprise any of a number of well-known, commercially available agents such as ARDEX® or FLO-TOP®, and may be selectively chosen to be lucid or, alternatively, a color additive may be added thereto to thus give the flooring of the present invention a desired color. As will be recognized, by virtue of the self-leveling nature of the topping 30, such topping 30 will spread out evenly about the dimensions of the substrate upon which the flooring is to be fabricated. Preferably, the layer of topping 30 applied to the substrate will have a thickness no greater than 1 inch, and, in a most preferred embodiment, will have a thickness of approximately ½ inch.

Once the self-leveling cementitious topping 30 has been given sufficient opportunity to become evenly distributed about the substrate 20, there is then applied the seed material 40 to the top thereof, more clearly seen in FIG. 2. As will be recognized, such seed material may comprise any of a wide variety of stones or other materials well-known to those skilled in the art, including granite or marble, that may be selectively chosen to give the flooring a desired appearance. Unlike prior art methods, such seed material 40 need only be poured upon the self-leveling topping 30 so that the same becomes evenly distributed thereupon. As such, such seed material 40 need not be subsequently troweled into mortar, as is typically required in most prior art methods. As an alternative to pouring the seed material 40 upon the topping 30, the seed material 40 may be seeded upon the topping 30 by hand, or as an additional alternative, may be integrally mixed with the cementitious self-leveling topping 30 at the outset, with the resultant mixture then being applied to the substrate 20.

The self-leveling topping 30, after having the seed material 40 embedded therewithin, is then allowed to dry. Advantageously, the drying step of the method of the present invention, shown as 50 in flow diagram of FIG. 3, will take between approximately four to six hours, which is substantially less than the time usually associated for concrete to dry in conventional terrazzo-type floorings. Once sufficiently dry, the top surface of the flooring is ground, via a grinding step 60, such that the top surface thereof is substantially flat and smooth. As will be recognized by those skilled in the art, the surface grinding step 60 may be carried out by numerous conventional methods, such as by use of a surface grinder. A sealer 70, such as an acrylic sealer, may then be applied to the flooring to thus give the flooring a polished, wet look.

The resultant flooring will thus be formed having the desired, aesthetically pleasing appearance that can be manufactured to substantially simulate the appearance of terrazzo. The flooring will also be extremely durable and capable of withstanding significant pedestrian traffic thereover. Still further, because of the fact that the flooring of the present invention will have a thickness preferably less than 1 inch, and preferably a thickness of approximately ½ inch, the flooring will thus be capable of being formed on a variety of surfaces that are not dependent upon the ability of the substrate to support such other prior art floorings.

Although the invention has been described herein with specific reference to a presently preferred embodiment thereof, it will be appreciated by those skilled in the art that various additions, modifications, deletions and alterations may be made to such preferred embodiment without departing from the spirit and scope of the invention. Accordingly, it is intended that all reasonably foreseeable additions, modifications, deletions and alterations be included within the scope of the invention as defined in the following claims.

What is claimed is:

1. A method of producing an architectural flooring comprising the steps of:
    a) preparing a substrate upon which said flooring is to be formed;
    b) pouring a cementitious, self-leveling topping upon said substrate;
    c) broadcasting a quantity of seed material upon said cementitious, self-leveling topping;
    d) allowing said cementitious, self-leveling topping having said seed material broadcast thereon to become sufficiently dry;
    e) grinding an upper surface of said topping having said seed material embedded thereupon; and
    f) applying a sealer to the upper surface of said cementitious, self-leveling topping.

2. The method of claim 1 wherein in step b), said cementitious, self-leveling topping is poured upon said substrate to a thickness less than 1 inch.

3. The method of claim 2 wherein in step b), said cementitious, self-leveling topping is poured upon said substrate to a thickness of approximately ½ inch.

4. The method of claim 1 wherein in step b), said cementitious, self-leveling topping is lucid.

5. The method of claim 1 wherein step b) further comprises the step of mixing cementitious, self-leveling topping with a color additive.

6. The method of claim 1 wherein step c) comprises hand seeding said seed material upon said cementitious, self-leveling topping.

7. The method of claim 1 wherein said seed material is selected from the group consisting of granite and marble.

8. An architectural flooring formed by the method of claim 1.

9. A method of producing an architectural flooring comprising the steps of:
    a) preparing a substrate upon which said flooring is to be formed;
    b) integrally mixing a seed material with a cementitious, self-leveling topping;

c) applying said cementitious, self-leveling topping having said seed material integrally mixed therewith upon said substrate;

d) allowing said cementitious, self-leveling topping having said seed material integrally mixed therewith to become sufficiently dry;

e) grinding an upper surface of said topping having said seed material embedded therewithin; and f) applying a seal to the upper surface of said cementitious, self-leveling topping.

10. The method of claim 9 wherein in step b), said cementitious, self-leveling topping is poured upon said substrate to a thickness of no greater than 1 inch.

11. The method of claim 9 wherein in step b), said cementitious, self-leveling topping is poured upon said substrate to a thickness of approximately ½ inch.

12. The method of claim 9 wherein in step b), said cementitious, self-leveling topping is lucid.

13. The method of claim 9 wherein step b) further comprises the step of mixing said cementitious, self-leveling topping and seed material with a color additive.

14. The method of claim 1 wherein said seed material is selected from the group consisting of granite and marble.

15. An architectural flooring formed by the method of claim 9.

* * * * *